United States Patent
Lamar

(10) Patent No.: US 10,611,134 B2
(45) Date of Patent: Apr. 7, 2020

(54) GROUTLESS PATTERNS FOR PAVEMENT SURFACES USING THERMOPLASTIC PREFORMS

(71) Applicant: Mark Brendan Lamar, Thomasville, NC (US)

(72) Inventor: Mark Brendan Lamar, Thomasville, NC (US)

(*) Notice: Subject to any disclaimer, the term of this patent is extended or adjusted under 35 U.S.C. 154(b) by 0 days.

(21) Appl. No.: 14/722,408

(22) Filed: May 27, 2015

(65) Prior Publication Data
US 2015/0330035 A1 Nov. 19, 2015

Related U.S. Application Data

(63) Continuation of application No. 29/523,028, filed on Apr. 6, 2015, and a continuation of application No.
(Continued)

(51) Int. Cl.
*B32B 3/10* (2006.01)
*B32B 37/06* (2006.01)
(Continued)

(52) U.S. Cl.
CPC ............. *B32B 37/06* (2013.01); *B32B 37/12* (2013.01); *E01C 5/20* (2013.01); *E01C 5/22* (2013.01);
(Continued)

(58) Field of Classification Search
None
See application file for complete search history.

(56) References Cited

U.S. PATENT DOCUMENTS

| 5,215,402 A | 6/1993 | Stowell et al. |
| 6,656,566 B1 | 12/2003 | Kuykendall et al. |

(Continued)

FOREIGN PATENT DOCUMENTS

RU 135323 U1 12/2013

OTHER PUBLICATIONS

Federal Institute of Industrial Property (ISA/RU). International Search Report for PCT/US2015/032548, dated Feb. 4, 2016.
(Continued)

*Primary Examiner* — Christopher M Polley
(74) *Attorney, Agent, or Firm* — Kilpatrick Townsend & Stockton LLP

(57) ABSTRACT

The disclosure describes an article of manufacture and method of forming one or more paver or paver-like patterned preforms for application to a pavement surface. The pattern may be selected for functional or decorative purposes. These distinct thermoplastic pavement marking patterned preforms comprise at least four independent sections wherein each of the four independent sections are placed on a pavement surface such that the four independent sections are separate and distinct and the four sections have top surfaces that are coplanar and also different from one another wherein the difference is selected from the group consisting of: different shades, different colors, and different textures, and wherein at least two of the four independent sections that are contiguous with each other are different shades, colors, or textures and wherein no grout line exists separating any of the four independent sections that combined together comprise the patterned preforms.

16 Claims, 8 Drawing Sheets

Related U.S. Application Data

29/523,031, filed on Apr. 6, 2015, and a continuation of application No. 12/592,462, filed on Nov. 25, 2009, now Pat. No. 9,234,322.

(51) Int. Cl.

| | | |
|---|---|---|
| *B32B 37/12* | (2006.01) | |
| *E01C 5/20* | (2006.01) | |
| *E01F 9/512* | (2016.01) | |
| *E01C 5/22* | (2006.01) | |
| *E01C 11/00* | (2006.01) | |
| *E01C 11/24* | (2006.01) | |
| *E01C 15/00* | (2006.01) | |

(52) U.S. Cl.
CPC ............... *E01C 11/00* (2013.01); *E01C 11/24* (2013.01); *E01C 15/00* (2013.01); *E01F 9/512* (2016.02); *B32B 2309/02* (2013.01); *B32B 2419/04* (2013.01); *Y10T 156/10* (2015.01)

(56) References Cited

U.S. PATENT DOCUMENTS

| | | |
|---|---|---|
| D509,596 S | 9/2005 | Cant |
| 7,645,503 B1 * | 1/2010 | Greer ................... E01F 9/518 156/71 |
| D689,627 S | 9/2013 | Parker et al. |
| D690,032 S | 9/2013 | Parker et al. |
| D706,041 S | 6/2014 | Korkala et al. |
| 8,864,409 B2 | 10/2014 | Parker et al. |
| 2007/0218238 A1 | 9/2007 | Greer |
| 2010/0071832 A1 | 3/2010 | Greer et al. |
| 2014/0165435 A1 | 6/2014 | Greer et al. |

OTHER PUBLICATIONS

Multi-Color Interconnected Preformed Thermoplastic Pavement Marking Material, Traffic Patterns GF Grout Free 125, Mar. 12, 2015, p. 1-2.

* cited by examiner

GROUTLESS PATTERNS FOR PAVEMENT SURFACES USING THERMOPLASTIC PREFORMS

PRIORITY STATEMENT(S)

The following application is a continuation of and claims benefit of U.S. Design patent application No. 29/523,028 filed on Apr. 6, 2015 and U.S. Design application 29/523, 031 also filed on Apr. 6, 2015. This application is also a continuation-in-part of and claims priority to U.S. nonprovisional patent application Ser. No. 12/592,462, filed Nov. 25, 2009 and entitled, "Pavement Marking Pattern and Method".

TECHNICAL FIELD

The present invention relates to a method of forming multiple patterns onto a pavement surface from a single thermoplastic patterned preform that includes four independent and distinct sections that taken together (collectively) comprise a simulated groutless paver or paver-like pattern. The groutless pattern is selected for functional and decorative purposes in lieu of using conventional pavers.

BACKGROUND

Various methods for forming patterns on paved surfaces are known in the related art. The Applicant is the owner of U.S. Pat. No. 8,864,409 describing a method of forming multiple inlaid patterns to complete a final predetermined rotational pattern onto or into a pavement surface. This pattern is provided by a method including the steps of providing a first template created of multiple blocks with portions of rotational isometric patterns having a predetermined pattern; impressing the first template into the pavement surface when the pavement surface is in a pliable state forming an impression followed by removing the first template from the pavement surface and exposing the impression; providing a grid having a predetermined pattern matching the pattern of the first template; inserting the grid into the impression; and fixing the grid in position within the impression to form the inlaid pattern thereby creating multiple blocks with grout sections separating these patterns or portions of these patterns. Applicant is also the owner of U.S. Pat. No. 5,215,402, which describes a method of forming a pattern in an asphalt surface using a removable template. This template is compressed into a pliable asphalt surface to imprint a predetermined pattern simulating, for example, the appearance of bricks, cobblestones, interlocking paving stones or the like. The template is then lifted clear of the asphalt surface and the asphalt is allowed to harden. A thin layer of a cementitious coating may be applied to the imprinted asphalt to enhance the brick and mortar or other desired effect. This pattern includes the use of grout or grout-like sections that separate the interlocking bricks, cobblestones, and interlocking paving stones. In the above-described method the template does not remain inlaid within the asphalt surface. The visual effect is created by the combination of the imprinted pattern and the decorative coating. One important and distinctive drawback to this method and the finished product is that the decorative coating may wear off over time, particularly in high traffic areas.

It also known that it is possible to install traffic markings on asphalt surfaces. However, such markings typically extend and project above the asphalt surface and are relatively bulky. In regions receiving frequent snowfalls during the winter months, traffic markings may often be removed or damaged during snowplow usage. In fact, these patented inventions teach away from the present disclosure in that the use of grout regions for a "paver" patterned preform thermoplastic products are in opposition with the features of that of the present disclosure.

A useful description of a paver pattern is as follows; a number of paving-stones, tiles, bricks, or brick-like pieces of concrete commonly used as exterior flooring. In a factory, concrete pavers are made by pouring a mixture of concrete and optionally some type of coloring agent into a mold of some shape and allowing it to set. They are applied by pouring a standard concrete foundation, spreading sand on top, and then laying the pavers in the desired pattern. Ancient pavers were simply stones or bricks manually inserted into the ground and formed many of the roadways found in ancient Greece and Rome. Many paver type roadways are still found in Europe as well as older North American cities in the United States including Boston and New York. No actual adhesive or retaining method is used other than the weight of the paver itself with the exception of edging. Pavers can be used to make roads, driveways, patios, walkways and other outdoor platforms. Another method for producing similar types of paver traffic markings involves grinding grooves in pavement surfaces and then pouring into these grooves a hot molten material which is allowed to set in place causing an intentional displacement between the grooves and the paver stones, tines, bricks, etc. However, this is a very time consuming procedure, and is not well suited for forming complicated patterns, or covering large surface areas. The need therefore exists and remains for improved materials and methods to provide groutless patterns on paved surfaces which simulate pavers but are less labor intensive, less costly, quicker to install, and also provide a safer and smoother surface than the heretofore conventional alternatives.

SUMMARY OF INVENTION

The present disclosure involves one or more distinct thermoplastic pavement marking patterned preforms comprising at least four independent sections wherein each of the four independent sections are placed on a pavement surface as one complete sheet such that the four independent sections are separate and distinct and the four sections have top surfaces that are coplanar and are also different from one another wherein the difference is selected from the group consisting of: different shades, different colors, and different textures, and wherein at least two of the four independent sections that are contiguous with each other are different shades, colors, or textures and wherein grout lines are non-existent in separating any of the four independent sections that combined together comprise the patterned preforms.

More specifically, the one or more distinct thermoplastic pavement marking patterned preforms comprise: at least four independent sections wherein each of the four independent sections are placed on a pavement surface such that the four independent sections are separate and distinct as one complete sheet and the four sections have top surfaces that are coplanar and also different from one another wherein the difference is selected from the group consisting of: different shades, different colors, and different textures, and wherein at least two of the four independent sections that are contiguous with each other are different shades, colors, or textures and wherein no grout line exists separating any of the four independent sections that combined together comprise patterned preforms.

In addition the patterns are paver patterns and/or exhibit paver-like appearances that simulate conventional paver installations and the patterns simulate a brick paver on said pavement surface and wherein different colored brick patterned sections fit together so as to obviate grout lines and also obviate inserted inlaid grout features.

Also, in this manner, trip hazards due to grout lines and non-coplanar portions of said preforms associated with brick pavers are reduced or eliminated. This embodiment includes the fact that preforms are neither picked up or removed due to pedestrian or vehicular traffic or the use of plows over the surface of the preforms.

The preforms are also of a uniform thickness across the patterned preforms.

In a separate embodiment the preforms are of a uniform height across the top surfaces thereby eliminating roughness, friction due to traffic across the surfaces, and planar unevenness thereby providing increased safety and reduced vibrations when a pedestrian or vehicle crosses the top surfaces. Here, the preforms are adhesively applied to the pavement surface.

In a further embodiment the adhesively applied preforms are 2×2 sheets each having at least one complete set of 4 independent sections thereby forming the patterned preforms.

Additionally, the top, bottom, left and right edges are in alignment to ensure that brick colors and patterns on one preformed patterned sheet will match colors and patterns on a second and subsequent preformed patterned sheet and sheets are sequentially positioned such that full brick or other patterns of the preforms provide a continuous and contiguous pattern with the top, bottom, left, and right edges.

In a further embodiment, a first independent section and a second independent section form an intersection therebetween and include an adhesive, wherein the adhesive bridges an intersection to maintain and ensure marking pattern integrity and wherein the adhesive is either a thermoset or thermoplastic adhesive and is sprayable.

The preforms comprise a first independent thermoplastic section, a second independent thermoplastic section, where the first section is contiguous with the second section to form an intersection therebetween, with the use of a sprayed thermoplastic adhesive, wherein the sprayed thermoplastic adhesive bridges the intersection and is adhered to the first and said second sections in order to maintain pattern integrity.

A method of applying one or more distinct thermoplastic pavement marking patterned preforms having multiple contiguous sections to a substrate simulating a paver or paver-like patterns comprising the steps of:
   a) forming a singular planar paver marking pattern having coplanar, contiguous independent sections, which form intersections therebetween;
   b) adhering the contiguous independent sections together by applying an adhesive which bridges the intersections; and
   c) adhering the paver or paver-like patterned preforms to the substrate.

Forming a planar pattern further comprises the step of forming a paver or paver-like pattern of thermoplastic or thermosetting sections and wherein adhering the contiguous sections comprises the step of spraying a hot melt thermoplastic adhesive to bottoms of the contiguous sections. This method includes adhering contiguous sections comprising the step of applying a polyamide based resin having a softening point of between 105°-120° C.

An additional method of making a pre-bonded preformed thermoplastic patterned sheet section comprises: providing a first, second, third and fourth independent thermoplastic sheet section that is laid onto a pavement surface and wherein the patterned sheet section maintains a coplanar top surface that is patterned to simulate a paver or paver-like top surface and wherein the patterned sheet section comprises a top surface and a bottom surface, such that the patterned sheet section is in direct contact with a paved surface and further comprises applying an adhesive backing layer on the bottom surface wherein the adhesive backing layer is bridging and bonding an intersection of the patterned sheet section and the paved surface to form a unified pavement paver or paver-like pattern thereby preventing dislodging or separation of the preformed thermoplastic patterned sheet during handling, movement, transportation, and application.

This method works for paved surfaces of asphalt and/or concrete.

This method also includes the step of fixing the patterned sheet section in position with the paved surface comprising heating the patterned sheet section after application of the patterned sheet section onto the paved surface to cause the patterned sheet section to bond to the paved surface.

The patterned sheet section is often heated to a temperature within the range of approximately 100 to 400 degrees Fahrenheit.

The patterned sheet section often comprises a pre-formed thermoplastic pattern.

The patterned sheet section is often of unitary construction and includes one or more colors contrasting with colors of the paved surface.

In an additional embodiment the patterned sheet section comprises retroflective elements including glass beads and skid resistant elements that provide the patterned sheet section retroflective capabilities after the patterned sheet section is fixed in position on the paved surface and wherein the patterned sheet section is luminescent and/or fluorescent.

The patterned sheet section comprises an upper surface and a lower surface wherein the upper surface is substantially flush with a surface of the pavement surface when the patterned sheet section is fixed in position, thereby providing a decorative patterned sheet section that is either linear or non-linear.

The heating may comprise passing a portable surface heater over an upper surface of the patterned sheet section after the patterned sheet section has been inserted onto the paved surface.

One other embodiment includes a method of forming multiple paver or paver-like patterns to complete a final predetermined paver pattern onto or into a pavement surface comprising:
   (a) a patterned sheet section for creating multiple blocks with portions of paver patterns;
   (b) adhesively applying the patterned sheet section onto the pavement surface when the surface is in a pliable state;
   (c) leaving the patterned sheet section on the surface; and;
   (d) creating multiple blocks of the portions of the patterns such that paver patterns form a final paver or paver-like uniplanar patterned preform.

The predetermined pattern is decorative and can be non-linear.

In another alternative embodiment, the single isometric thermoplastic, rotatable, homogeneous quarter round surface patterned preform is produced as thermoplastic sheeting, as described in commonly owned U.S. Pat. No. 7,645,503 which is hereby fully incorporated by reference, composed of two or more independent sections. The first section is a grid, which in one specific case replicates the appearance of mortar joints as they would form a brick wall. An additional or second section could for example, replicate bricks which are contained within the grid section. The first and second sections possess a hot melt adhesive spray that is utilized on the bottom surface of the marking pattern to bridge the intersections between the first and second sections to maintain the integrity of the marking pattern for convenience during handling and application to a substrate and packaged for shipment. Preferably the hot melt spray adhesive has approximately the same softening point range as the patterned sections, to accommodate heat treatment of the marking pattern during application of the marking pattern to the substrate and eventually to the pavement. In this embodiment, the grid could be replaced by continuous thermoplastic sheets formed in the desired shape and pattern. These thermoplastic sheets may not be inlaid into the pavement but may nevertheless be gently heated as described above to adhere to the underlying asphalt substrate.

In another embodiment the preform can be used for comparatively large thermoplastic surfaces, such as corporate logos, traffic markings, pedestrian walkways, driveways or the like.

BRIEF DESCRIPTION OF THE DRAWINGS

The drawings listed below are precise embodiments of the invention, but should not be construed as restricting the spirit or scope of the invention in any way.

DETAILED DESCRIPTION OF THE DRAWINGS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
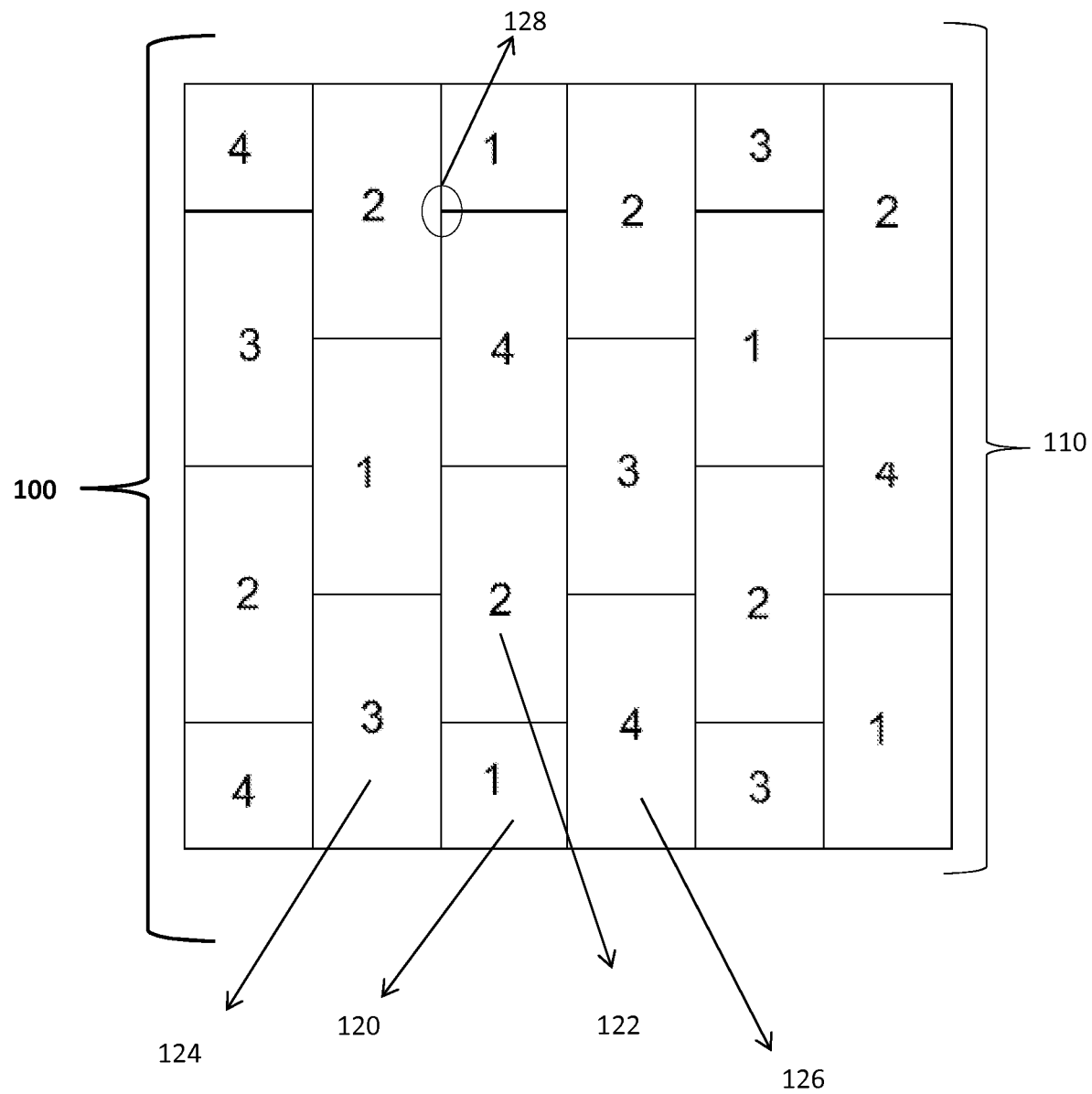
FIG. 1 is a top view of a portion of a groutless, homogeneous running bond preformed thermoplastic traffic pattern.
Figure 2A:
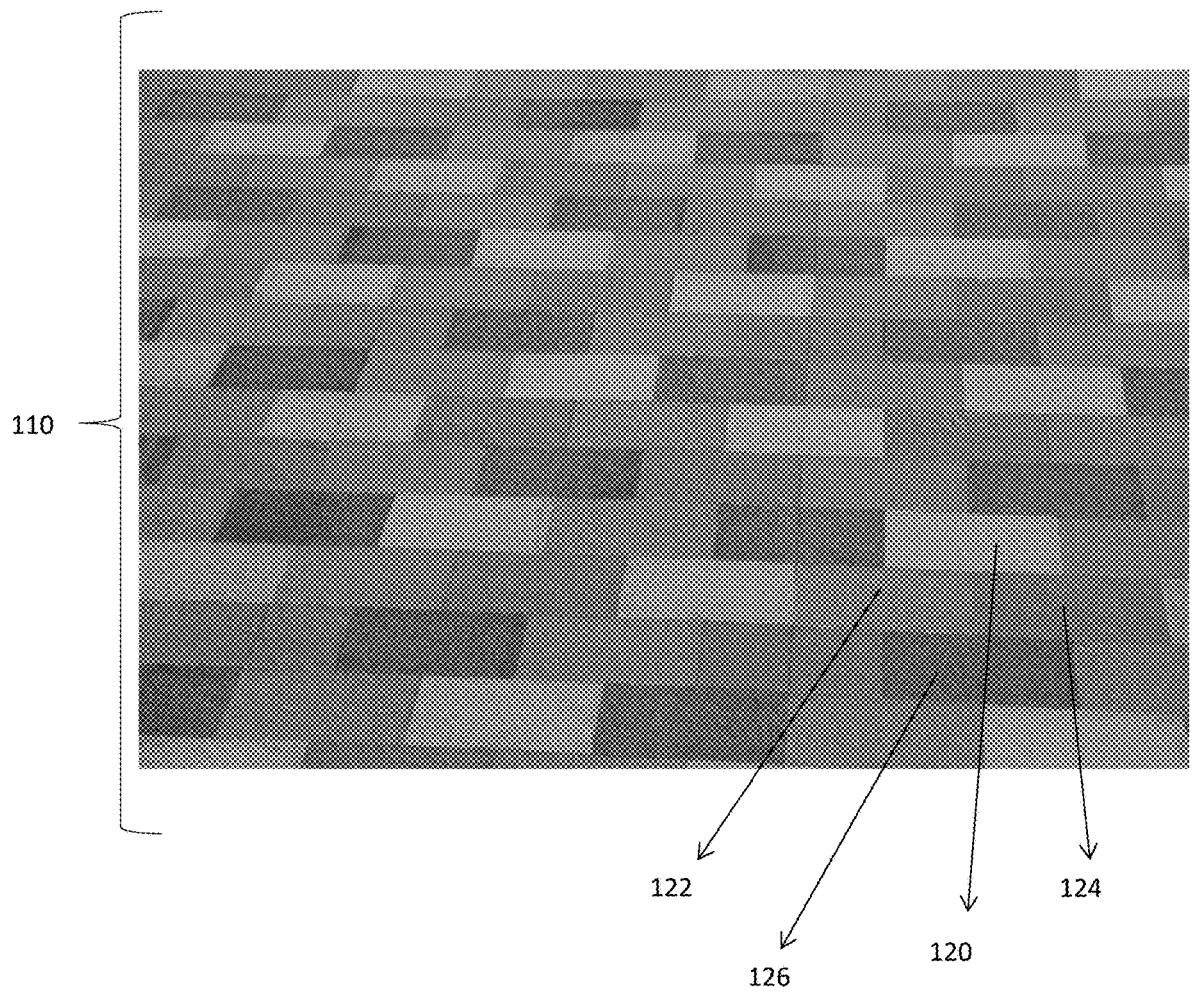
FIG. 2a provides a robust running bond pattern of contiguous thermoplastic sheets, as applied.
Figure 2B:
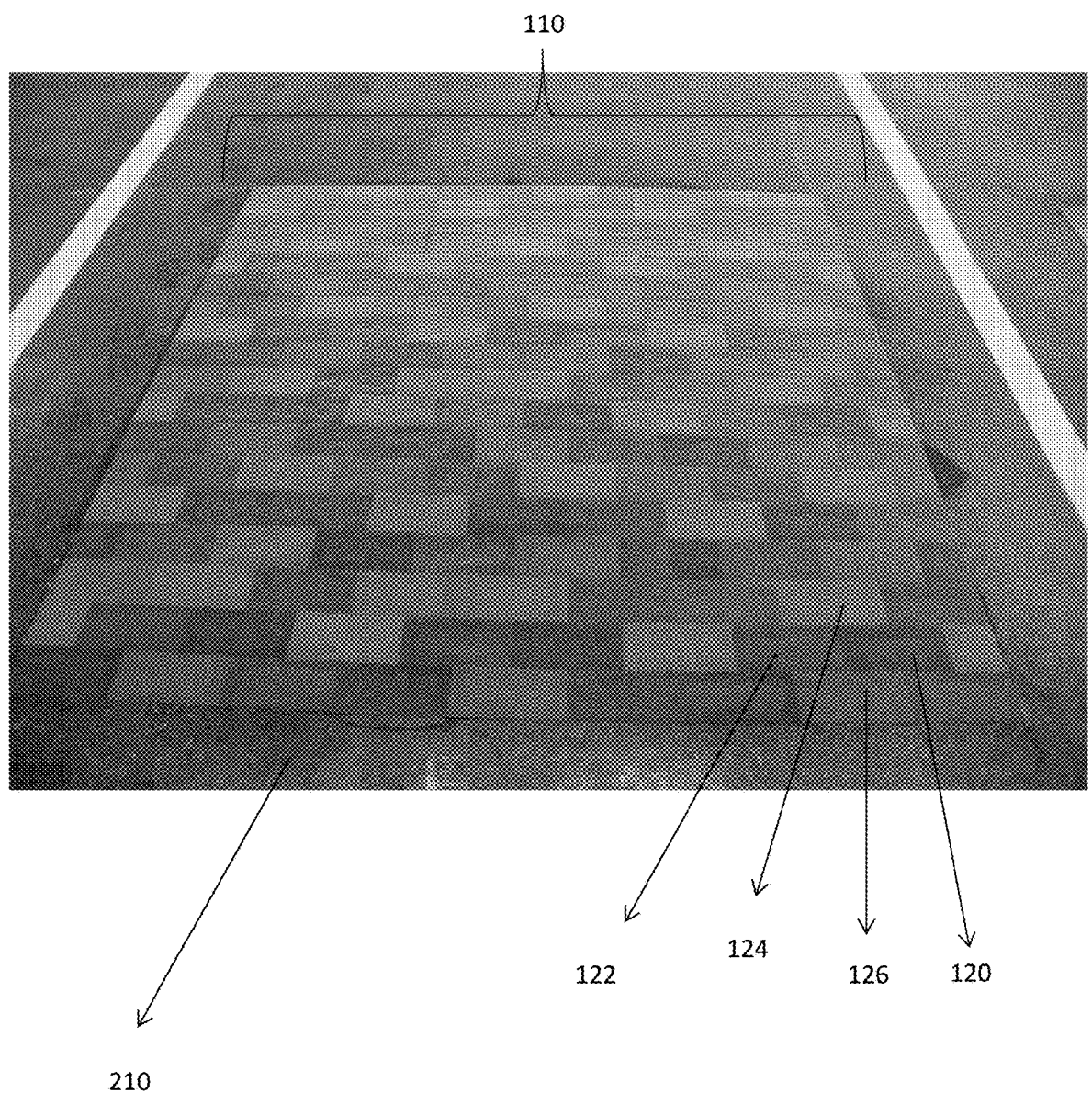
FIG. 2b provides a color variant robust running bond pattern of contiguous thermoplastic sheets, as applied.

FIG. 1 is a top plan view of an adhesively applied thermoplastic preform (patterned preform) [100] bearing a groutless, homogeneous running bond pattern [110] for a pavement surface (as shown in FIG. 2b), wherein at least four independent sections, labeled as 1, 2, 3, 4 [120, 122, 124, 126], provide differences selected from the group consisting of: different shades, different colors, and different textures.

In the present disclosure, no two like independent sections [120, 122, 124, 126] are conjoined and grout lines are non-existent in separating any of the four independent sections [120, 122, 124, 126] that combined together comprise the patterned preforms [100]. Any lines of separation [128] existing graphically are only shown to discern the conjoining of the independent sections [120, 122, 124, 126].

FIG. 1 provides for a single thermoplastic sheet and can be used in single or in combination with itself to generate a robust pattern.

FIG. 2a is a photographic depiction of an adhesively applied thermoplastic preform (patterned preform) [100] illustrating a groutless, homogeneous running bond pattern [110] as applied to a pavement surface (as shown in FIG. 2b). The four independent sections [120, 122, 124, 126] are shown providing differences of colors wherein no two same independent sections [120, 122, 124, 126] are conjoined and wherein grout lines are non-existent in separating any of the four independent sections [120, 122, 124, 126]. FIG. 2a provides a robust running bond pattern [110] of contiguous thermoplastic sheets.

FIG. 2b is a photographic depiction of an adhesively applied thermoplastic preform (patterned preform) [100] bearing a groutless, homogeneous running bond pattern [110] as applied to a pavement surface [210]. The four independent sections [120, 122, 124, 126] are shown providing differences of colors (in a four shade variation from FIG. 2a) wherein no two same independent sections [120, 122, 124, 126] are conjoined and wherein grout lines are non-existent in separating any of the four independent sections [120, 122, 124, 126]. FIG. 2b provides a color variant robust running bond pattern [110] of contiguous thermoplastic sheets.

Figure 2C:
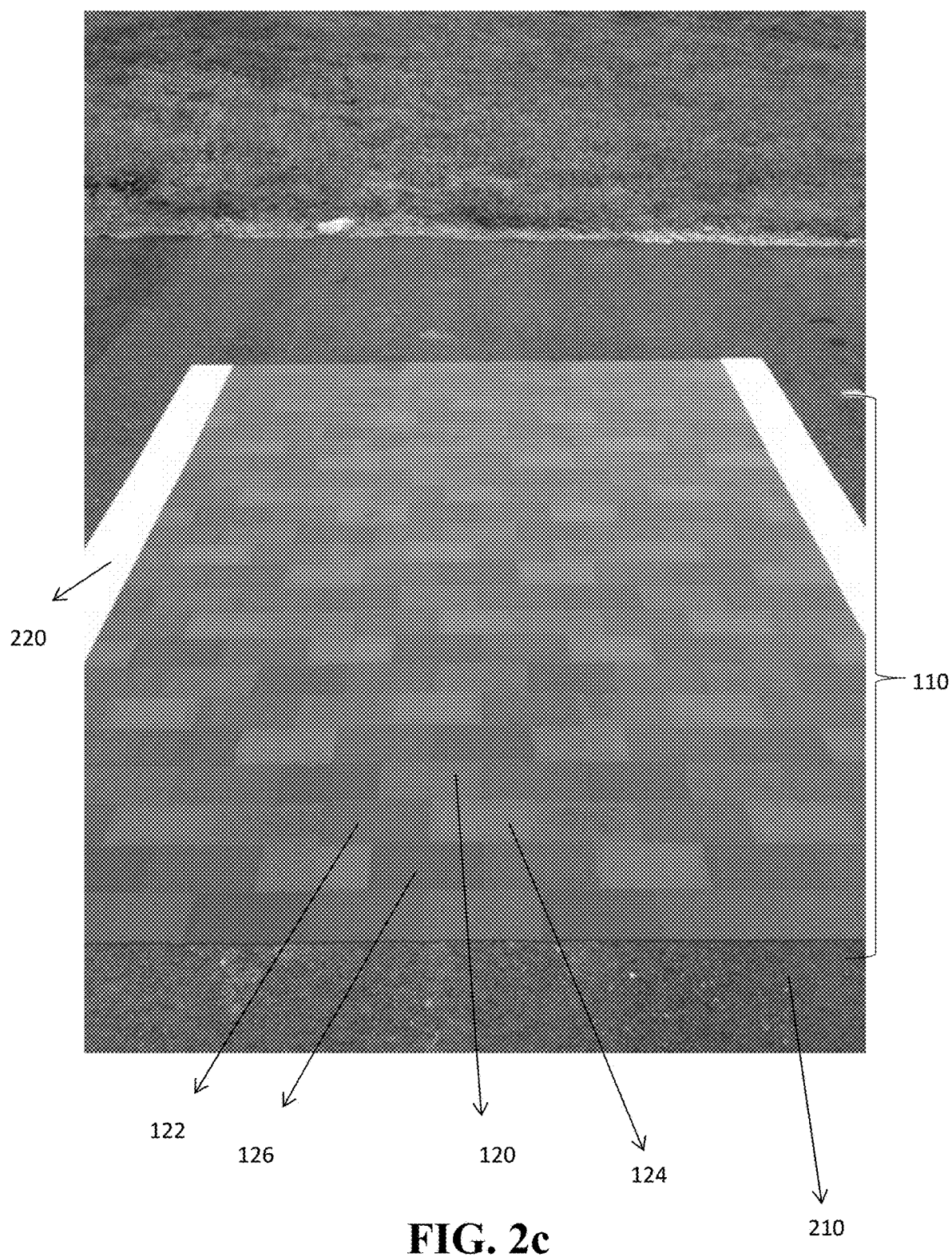
FIG. 2c provides a further color variant robust pattern of contiguous thermoplastic sheets including a pedestrian crosswalk border feature, as applied.

FIG. 2c is a photographic depiction of an adhesively applied thermoplastic preform (patterned preform) [100] bearing a groutless, homogeneous running bond pattern [110] as applied to a pavement surface [210]. The four independent sections [120, 122, 124, 126] are shown providing differences of colors (in a four shade variation from FIGS. 2a and 2b) wherein no two same independent sections [120, 122, 124, 126] are conjoined and wherein grout lines are non-existent in separating any of the four independent sections [120, 122, 124, 126]. The inclusion of a pedestrian crosswalk border feature [220] is shown.

FIG. 2c provides a further color variant robust running bond pattern [110] of contiguous thermoplastic sheets including a pedestrian crosswalk border feature [220].

Figure 3:
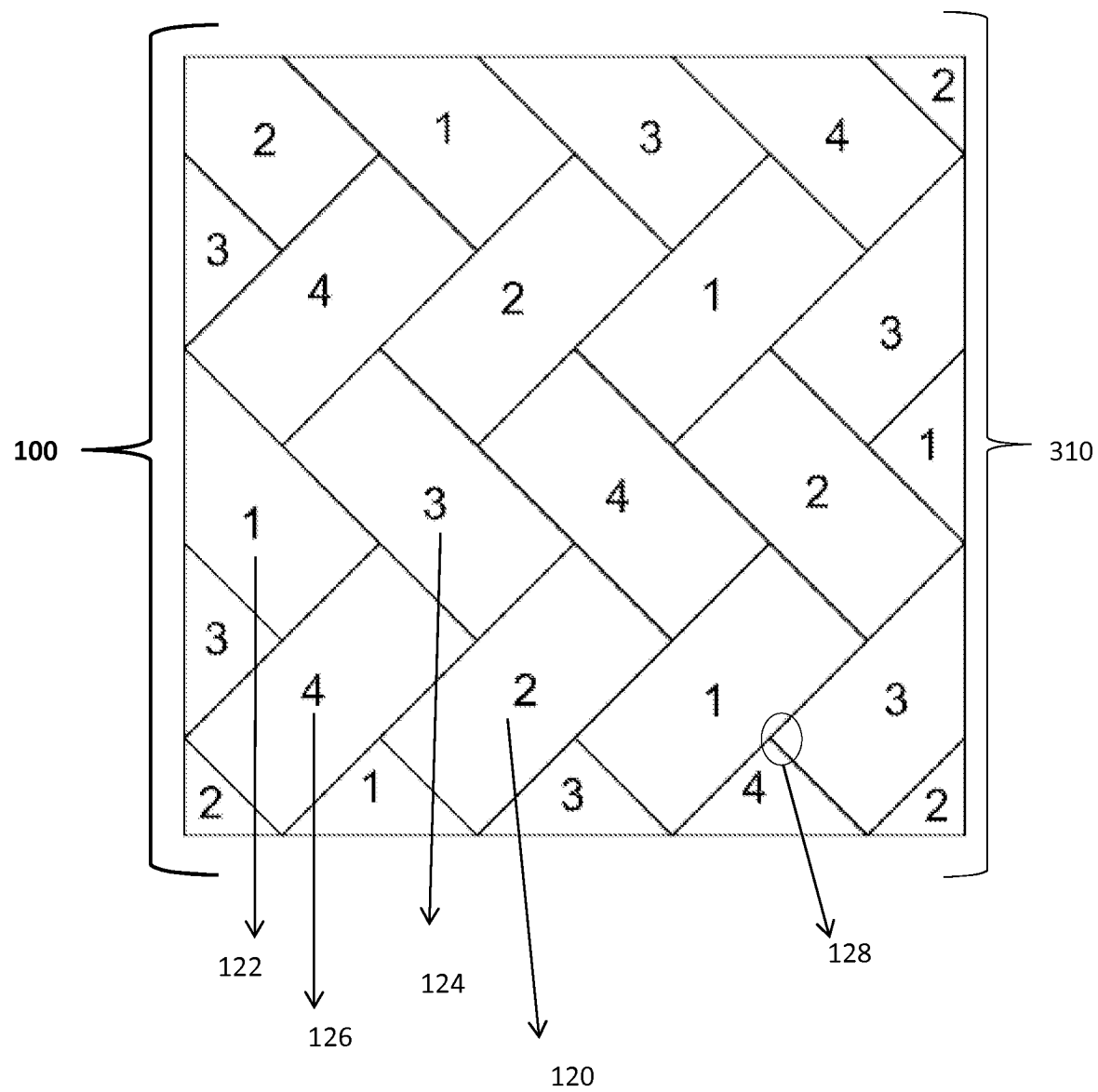
FIG. 3 is a top view of a portion of a groutless, homogeneous herringbone preformed thermoplastic traffic pattern.

FIG. 3 is a top plan view of an adhesively applied thermoplastic preform [100] bearing a herringbone pattern [310] for a pavement surface [210], wherein at least four independent sections, labeled as 1, 2, 3, 4 [120, 122, 124, 126], provide differences selected from the group consisting of: different shades, different colors, and different textures.

In the present disclosure, no two like independent sections [120, 122, 124, 126] are conjoined and grout lines are non-existent in separating any of the four independent sections [120, 122, 124, 126] that combined together comprise the patterned preforms [100]. Any lines of separation [128] existing graphically are only to discern the conjoining of the independent sections [120, 122, 124, 126].

FIG. 3 provides for a single thermoplastic sheet and can be used singularly or in combination with itself to generate a robust pattern.

Figure 4A:
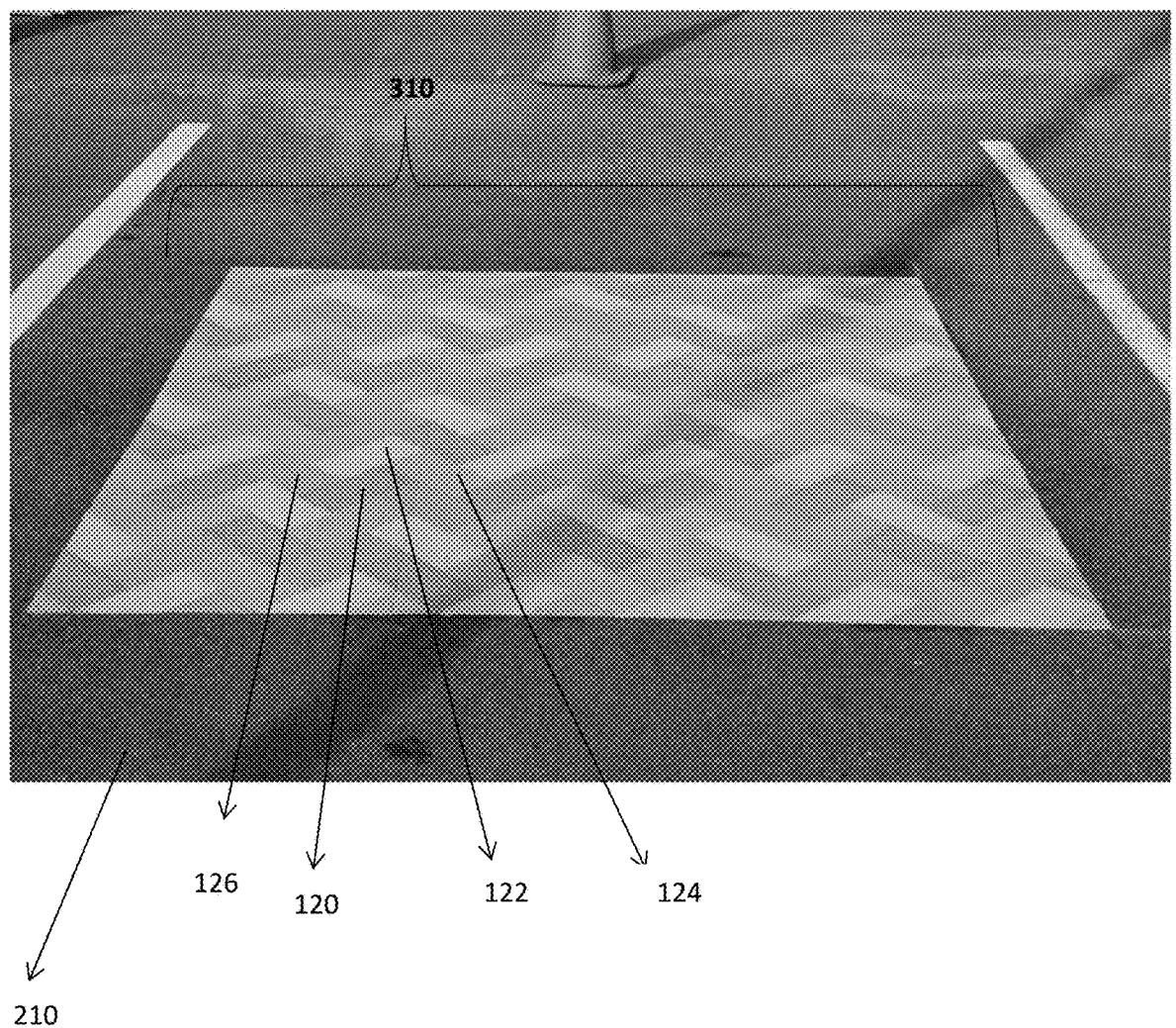
FIG. 4a provides a robust herringbone pattern of contiguous thermoplastic sheets, as applied.

FIG. 4a is a photographic depiction of an adhesively applied thermoplastic preform (patterned preform) [100] bearing a groutless, homogeneous herringbone pattern [310] as applied to a pavement surface [210]. The four independent sections [120, 122, 124, 126] are shown providing differences of colors wherein no two same independent sections [120, 122, 124, 126] are conjoined and wherein grout lines are non-existent in separating any of the four independent sections [120, 122, 124, 126]. FIG. 4a provides a robust herringbone pattern [310] of contiguous thermoplastic sheets.

Figure 4B:
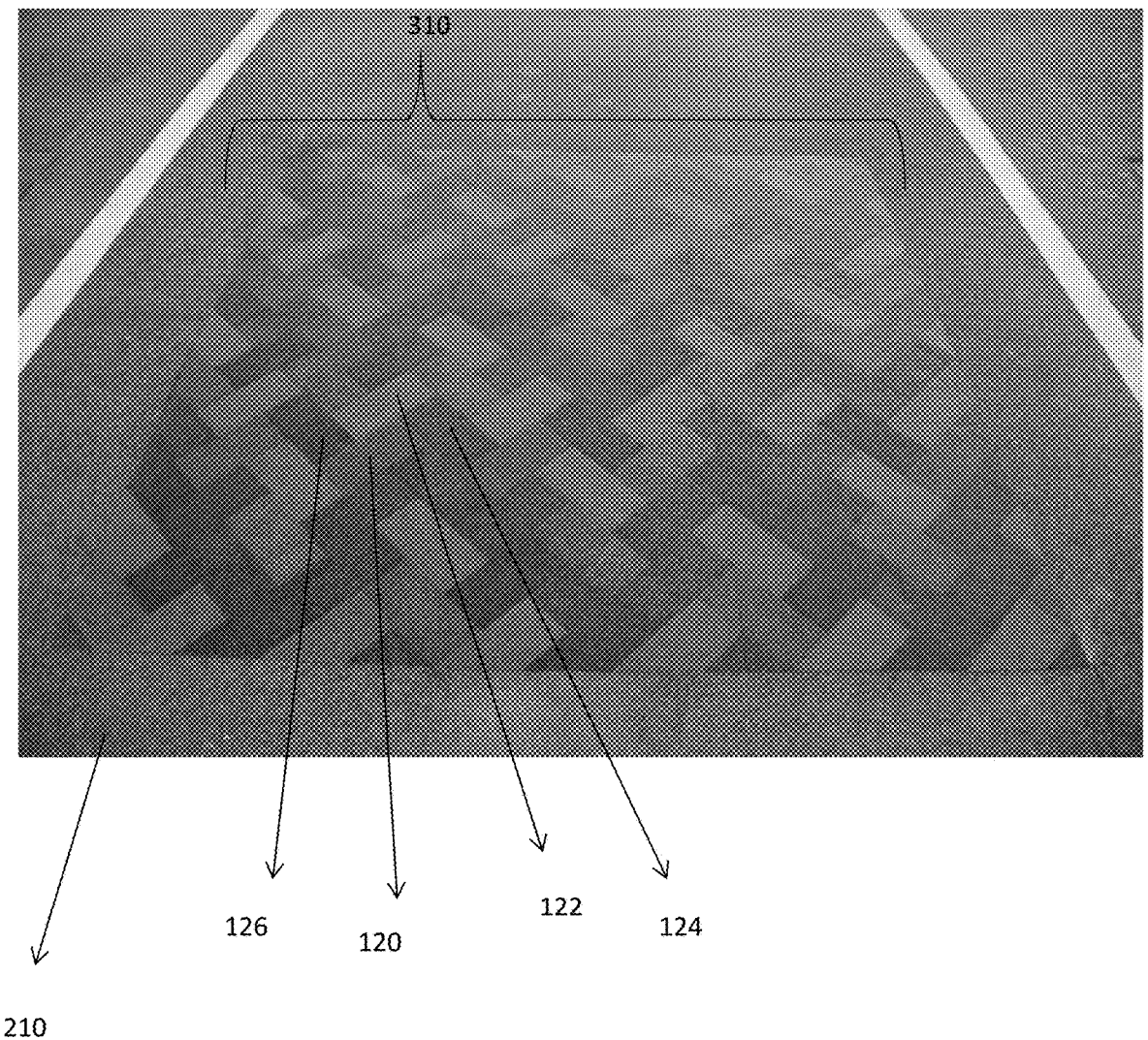
FIG. 4b provides a color variant robust herringbone pattern of contiguous thermoplastic sheets, as applied.

FIG. 4b is a photographic depiction of an adhesively applied thermoplastic preform (patterned preform) [100] bearing a groutless, homogeneous herringbone pattern [310] as applied to a pavement surface [210]. The four independent sections [120, 122, 124, 126] are shown providing differences of colors (in a four shade variation from FIG. 2a) wherein no two same independent sections [120, 122, 124, 126] are conjoined and wherein grout lines are non-existent in separating any of the four independent sections [120, 122, 124, 126]. FIG. 4b provides a color variant robust herringbone pattern [310] of contiguous thermoplastic sheets.

Figure 4C:
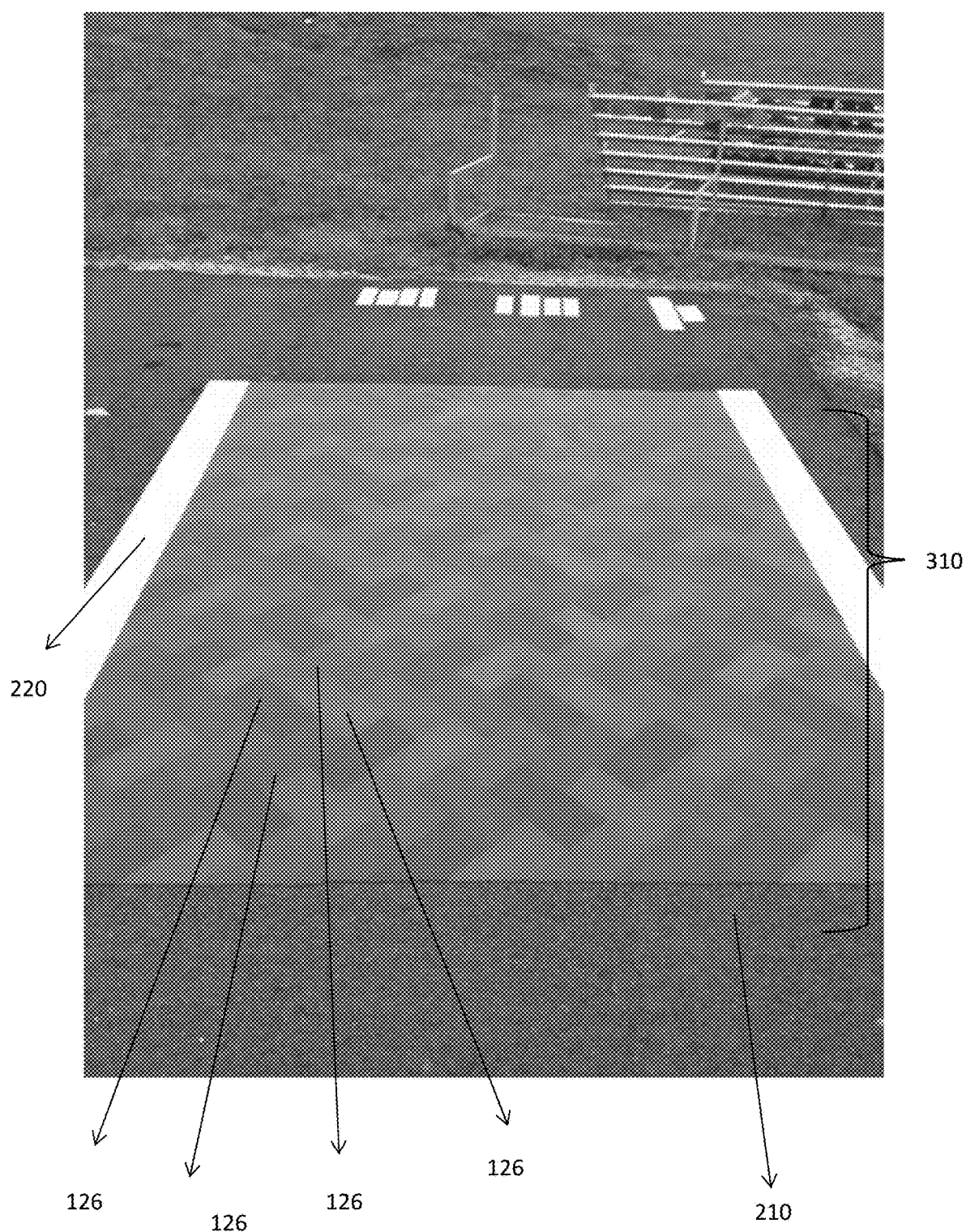
FIG. 4c provides a further color variant robust herringbone pattern of contiguous thermoplastic sheets including a pedestrian crosswalk border feature, as applied.

FIG. 4c is a photographic depiction of an adhesively applied thermoplastic preform (patterned preform) [100] illustrating a groutless, homogeneous herringbone pattern [310] as applied to a pavement surface [210]. The four independent sections [120, 122, 124, 126] are shown providing differences of colors (in a four shade variation from FIGS. 2a and 2b) wherein no two same independent sections [120, 122, 124, 126] are conjoined and wherein grout lines are non-existent in separating any of the four independent sections [120, 122, 124, 126]. The inclusion of a pedestrian crosswalk border feature [220] is shown. FIG. 4c provides a further color variant robust herringbone pattern [310] of contiguous thermoplastic sheets including a pedestrian crosswalk border feature [220].

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. One or more distinct thermoplastic pavement marking patterned preforms comprising: at least four independent sections, wherein each of said four independent sections are configured to be placed on a pavement surface such that said four independent sections are separate and distinct as one complete sheet and said four sections have top surfaces that are coplanar and different from one another, wherein said difference is selected from the group consisting of: different shades, different colors, and different textures, and wherein at least two of said four independent sections are contiguous with each other are different shades, colors, or textures and wherein said adhesively applied preforms are 2×2 sheets each having at least one complete set of 4 independent sections thereby forming said patterned preforms such that different colored brick patterned sections fit together with the independent sections arranged contiguous to each other with no border around the contiguous independent sections so as to obviate inserted inlaid grout features wherein said patterns simulate a brick paver on said pavement surface.

2. The one or more distinct thermoplastic pavement marking patterned preforms of claim 1, wherein non-coplanar portions of said preforms associated with brick pavers are reduced or eliminated.

3. The one or more distinct thermoplastic pavement marking patterned preforms of claim 1, wherein said preforms are neither picked up or removed due to use of plows over said surface of said preforms.

4. The one or more distinct thermoplastic pavement marking patterned preforms of claim 1, wherein said preforms are of a uniform thickness across said patterned preforms.

5. The one or more distinct thermoplastic pavement marking patterned preforms of claim 1, wherein said preforms are of a uniform height across said top surfaces thereby eliminating roughness, friction due to traffic across said surfaces, and planar unevenness thereby providing increased safety and reduced vibrations when a pedestrian or vehicle crosses said top surfaces.

6. The one or more distinct thermoplastic pavement marking patterned preforms of claim 1, wherein said preforms are adhesively applied to said pavement surface.

7. The one or more distinct thermoplastic pavement marking patterned preforms of claim 1, wherein top, bottom, left and right edges are in alignment to ensure that brick colors and patterns on one preformed patterned sheet will match colors and patterns on a second and subsequent preformed patterned sheet and sheets are sequentially positioned such that full brick or other patterns of said preforms provide a continuous and contiguous pattern with said top, bottom, left, and right edges.

8. The one or more distinct thermoplastic pavement marking patterned preforms of claim 1, wherein a first independent section and a second independent section form an intersection therebetween and include an adhesive, wherein said adhesive bridges said intersection to maintain and ensure marking pattern integrity and wherein said adhesive is either a thermoset or thermoplastic adhesive and is sprayable.

9. The one or more distinct thermoplastic pavement marking patterned preforms of claim 1, wherein said preforms comprises a first independent thermoplastic section, a second independent thermoplastic section, said first section contiguous to said second section to form an intersection therebetween, a sprayed thermoplastic adhesive, said sprayed thermoplastic adhesive bridging said intersection and adhered to said first and said second sections in order to maintain pattern integrity.

10. A thermoplastic pavement marking patterned preform comprising:
a plurality of first independent sections having a first color,
a plurality of second independent sections having a second color,
a plurality of third independent sections having a third color, and
a plurality of fourth independent sections having a fourth color,
wherein the first independent sections, second independent sections, third independent sections, and fourth independent sections are separate and distinct from one another and are conjoined adjacent to and contiguous with one another into a thermoplastic preform having no border around the contiguous independent sections, wherein the contiguous independent sections have a coplanar top surface, and wherein the first independent sections, second independent sections, third independent sections, and fourth independent sections are conjoined with one another such that no two same independent sections are conjoined adjacent to one another, and wherein none of the first color, second color, third color, or fourth color are the same.

11. The thermoplastic pavement marking patterned preform of claim 10, wherein the preform does not include inlaid grout features.

12. The thermoplastic pavement marking patterned preform of claim 10, wherein the preform exhibits features or appearances pavers or paver-like pattern.

13. The thermoplastic pavement marking patterned preform of claim 10, wherein each of the first independent sections, second independent sections, third independent sections, and fourth independent sections are conjoined to simulate a brick paver on a pavement surface.

14. The thermoplastic pavement marking patterned preform of claim 10, wherein a first independent section and a second independent section form an intersection therebetween and include an adhesive, wherein said adhesive bridges said intersection to maintain and ensure marking pattern integrity and wherein said adhesive is either a thermoset or thermoplastic adhesive and is sprayable.

15. A thermoplastic pavement marking patterned preform comprising:
   a plurality of first independent sections having a first shade variation,
   a plurality of second independent sections having a second shade variation,
   a plurality of third independent sections having a third shade variation, and
   a plurality of fourth independent sections having a fourth shade variation,
   wherein the first independent sections, second independent sections, third independent sections, and fourth independent sections are separate and distinct from one another and are conjoined adjacent to and contiguous with one another into a thermoplastic preform having a coplanar top surface, and wherein the independent sections are free of a thermoplastic preform border around the perimeter of each contiguous independent section, wherein the first independent sections, second independent sections, third independent sections, and fourth independent sections are conjoined such that no two same independent sections are conjoined adjacent to one another, and
   wherein none of the first shade variation, second shade variation, third shade variation, or fourth shade variation are the same.

16. The thermoplastic pavement marking patterned preform of claim 15, wherein the preform exhibits an appearance free of a border or inlaid grout features around each independent section.

* * * * *